Patented Aug. 8, 1950

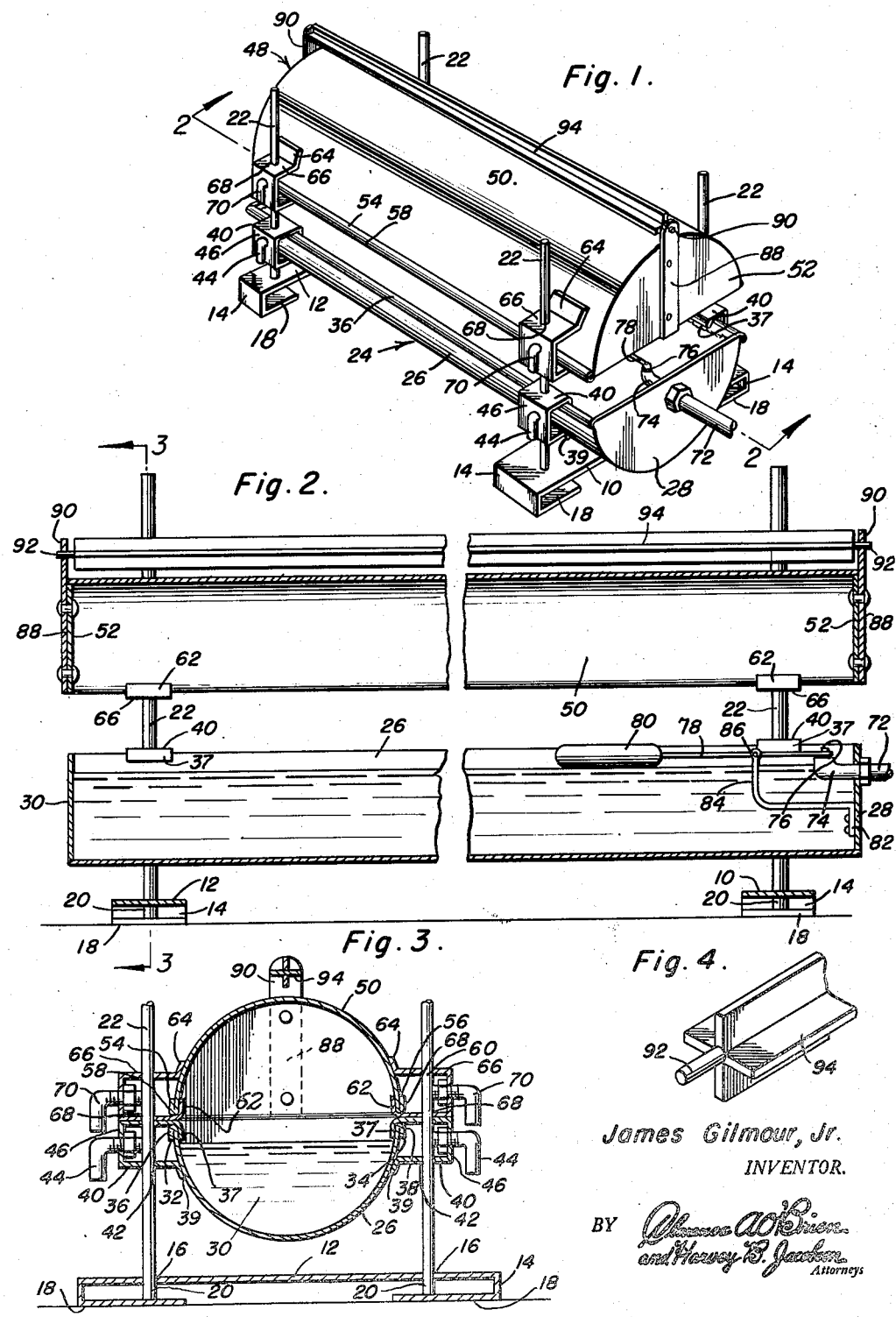

2,517,865

UNITED STATES PATENT OFFICE 2,517,865

ADJUSTABLE POULTRY WATERING TROUGH

James Gilmour, Jr., Plainfield, Ill.

Application December 17, 1947, Serial No. 792,285

4 Claims. (Cl. 119—78)

1

This invention relates to new and useful improvements in watering troughs, and the primary object of the present invention is to provide a feeding or watering trough for poultry including novel and improved adjustable closure means for selectively positioning the closure means relative to the trough so that small chickens or other poultry will have access to the water in the trough but the same will be prevented from bathing in the trough to contaminate the water or feed therein.

Another important object of the present invention is to provide an adjustable poultry watering trough including an inlet conduit and novel and improved means operatively connected to said inlet conduit for retaining a constant liquid level in the trough thus assuring a constant supply of cool fresh water for poultry.

A further object of the present invention is to provide an adjustable poultry watering or feeding trough so designed as to facilitate the same to be retained in a sanitary condition without undesirable foreign matter entering the same.

A still further aim of the present invention is to provide an adjustable poultry watering trough that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the adjustable poultry watering trough constructed in accordance with the present invention.

Figure 2 is a longitudinal vertical sectional view taken substantially on the plane of section line 2—2 of Figure 1;

Figure 3 is a transverse vertical sectional view taken substantially on the plane of section line 3—3 of Figure 2, and showing the closure in a completely closed position; and Figure 4 is a fragmentary perspective view of the anti-roost device used in conjunction with the present invention.

Referring now to the drawings in detail, wherein for the purpose of illustration, there is disclosed a preferred embodiment of the present invention, the numerals 10 and 12 represent a pair of substantially rectangular base members having their end portions turned inwardly to provide substantially channel-shaped bearing feet 14 that frictionally engage a supporting surface to retain the base members 10 and 12 in an elevated position. Extending through suitable apertures 16 in the plates 10 and 12, opposite the bearing portions 18 of the feet 14, are the lower ends 20 of a plurality of support posts or uprights 22 which are fixedly secured by welding or the like to the bearing portions 18 of the channel-shaped feet 14.

The trough or bin used in conjunction with the present invention, is designated generally by the numeral 24 and comprises an elongated, arcuate body or plate 26 having closure plates 28 and 30 at its ends. The longitudinal edges 32 and 34 of this arcuate plate 26 are turned outwardly to provide sleeves 36 and 38 that will prevent poultry using the trough from harmfully affecting themselves as they extend their necks into the trough.

Fixedly secured to the outer periphery of the plate 26 adjacent the sleeves 36 and 38 and the inner periphery of the plate 26 adjacent the sleeves 36 and 38, are the inner and outer flanged portions 37 and 39 of a plurality of outwardly extending lower, channel-shaped guides 40 which are disposed adjacent the closure plates 28 and 30. These lower guides 40 are provided with opposed openings 42 that slidably engage the uprights 22. Angulated set screws 44 adjustably carried by the web portions 46 of said lower guides 40, facilitate the selective positioning of the trough on the uprights 22 relative to the base members 10 and 12, so that the trough will be applicable for poultry of various sizes.

The numeral 48 represents the closure used in conjunction with the present invention generally, comprising an arcuate upper wall 50 that is closed at its ends by rigid end plates 52. It is noted, that the arcuate upper wall 50 is of a similar size and shape as the arcuate plate 26, so that when the trough 24 and closure 48 are applied in a closed position, as shown best in Figure 3, the same will be substantially in the form of a cylinder. The longitudinal edges 54 and 56 of the arcuate upper wall 50 are turned outwardly to provide longitudinal sleeves 58 and 60 which will permit poultry to engage the same without in any way injuring the said poultry.

Rigidly secured to the outer periphery of the arcuate upper wall 50, adjacent the sleeves 58 and 60, and the inner periphery of the arcuate upper wall 50, adjacent the sleeves 58 and 60, are the outer and inner flanged portions 62 and 64 of a plurality of upper channel-shaped guides 66 which are disposed adjacent the end plates 52 of the closure 48. These upper guides 66 are provided with opposed openings 68 that slidably engage the uprights 22, and adjustable angulated set screws 70 that engage the uprights 22 for selective adjustment and positioning of the closure 48 relative to the trough 24, so that poultry may extend their heads into the trough 24 but the same will be prevented from entering the trough to bathe therein which would contaminate the water or feed placed in the trough.

Removably applied to the end plate 28 of the trough 24, is an inlet conduit 72 that is suitably connected to a source of liquid, preferably water. At the inner end of the conduit 72, there is provided a discharge nozzle 74 having a control valve 76 disposed therein for regulating and controlling the flow of liquid that enters the trough 24. This valve 76 is connected to the stem or arm portion 78 of a suitable float 80. The out-turned end portion 82 of an L-shaped support 84 is fixed to the end plate 28 and the free end 86 of this support 84 is pivoted to stem 78. When the liquid level in the tank is at such a level as to raise the float 80 the valve 76 will be in a closed position, and liquid will be prevented from entering the trough. As the liquid in the tank is diminished by poultry, the float 80 will descend, opening the valve and permitting liquid to enter the trough until such time as the float again is actuated to effect a closing of the valve. By such a structure, the liquid level in the trough will remain constant and the liquid in the trough will be fresh and cool at all times.

Rigidly secured to the end plates 52, is a pair of opposed support straps 88, the ends 90 of which project upwardly from the central portion or uppermost extremity of the closure 48, to pivotally support pins 92 at the ends of an anti-roost member or blade-equipped rotor 94 that is so provided as to prevent and to discourage poultry from roosting on the closure to leave droppings thereon. Obviously, the outer rounded periphery of the closure will also prevent poultry from roosting thereon.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An adjustable poultry watering trough comprising a base, a plurality of support posts carried by said base, a trough, means adjustably securing said trough to said support posts, an inlet conduit carried by said trough including a discharge end disposed within said trough, means carried by the discharge end of said conduit for retaining a constant liquid level in said trough, a cover for said trough, means adjustably securing said cover to said support posts, and anti-roost means carried by said closure.

2. The combination of claim 1, wherein said trough includes an elongated arcuate body having rounded longitudinal edges.

3. The combination of claim 1, wherein said means carried by the discharge end of said conduit for retaining a constant liquid level in said trough includes a valve adjustably positioned in said discharge end, and a float operatively connected to said valve for actuating the latter.

4. An adjustable poultry watering trough comprising a pair of elevated, spaced base plates, support posts fixed on said base plates, an arcuate trough closed at each end, means carried by said trough and engaged with said posts for adjustably securing said trough relative to said support posts, an arcuate closure for said trough, means carried by said closure and received on said posts for adjustably securing said closure to said support posts, support arms fixedly carried by said closure, an anti-roost bar pivotally carried by said support arms, an inlet conduit carried by said trough, and means carried by said conduit for retaining a constant liquid level in said trough.

JAMES GILMOUR, Jr.

REFERENCES CITED

The following references are of record in the file of this patent:

UNITED STATES PATENTS

| Number | Name | Date |
|---|---|---|
| 462,146 | Leech | Oct. 27, 1891 |
| 1,029,745 | Eaton | June 18, 1912 |
| 1,067,377 | Schisler | July 15, 1913 |
| 1,172,584 | Conrad | Feb. 22, 1916 |
| 1,862,217 | Gay et al. | June 7, 1932 |
| 1,926,908 | Light | Sept. 12, 1933 |
| 2,127,804 | Ballard | Aug. 23, 1938 |
| 2,274,678 | Eliason | Mar. 3, 1942 |